United States Patent
Terashima et al.

(10) Patent No.: US 12,135,642 B2
(45) Date of Patent: Nov. 5, 2024

(54) SEMICONDUCTOR DEVICE

(71) Applicant: RENESAS ELECTRONICS CORPORATION, Tokyo (JP)

(72) Inventors: Kazuaki Terashima, Tokyo (JP); Atsushi Nakamura, Tokyo (JP); Yonghua Wang, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 44 days.

(21) Appl. No.: 18/186,476

(22) Filed: Mar. 20, 2023

(65) Prior Publication Data
US 2023/0376415 A1 Nov. 23, 2023

(30) Foreign Application Priority Data
May 18, 2022 (JP) .................. 2022-081417

(51) Int. Cl.
*G06F 12/08* (2016.01)
*G06F 7/50* (2006.01)
*G06F 7/523* (2006.01)

(52) U.S. Cl.
CPC ............... *G06F 12/08* (2013.01); *G06F 7/50* (2013.01); *G06F 7/523* (2013.01); *G06F 2213/28* (2013.01)

(58) Field of Classification Search
CPC . G06F 12/08; G06F 7/50; G06F 7/523; G06F 2213/28
See application file for complete search history.

(56) References Cited

U.S. PATENT DOCUMENTS

| | | | |
|---|---|---|---|
| 10,817,260 B1 * | 10/2020 | Huang | G06F 7/523 |
| 11,461,633 B2 | 10/2022 | Nakamura et al. | |
| 11,953,966 B1 * | 4/2024 | Wu | G06F 1/3237 |
| 2021/0132866 A1 | 5/2021 | Okumura et al. | |
| 2021/0192325 A1 * | 6/2021 | Hoang | G11C 13/0069 |
| 2022/0092399 A1 * | 3/2022 | Boyd | G06F 9/5027 |
| 2023/0049323 A1 * | 2/2023 | Li | G06F 15/7821 |

FOREIGN PATENT DOCUMENTS

| | | |
|---|---|---|
| JP | 2019-040403 A | 3/2019 |
| JP | 2021-076900 A | 5/2021 |

* cited by examiner

*Primary Examiner* — Nicholas J Simonetti
(74) *Attorney, Agent, or Firm* — Rimon P.C.

(57) ABSTRACT

A semiconductor device capable of reducing power consumption is provided. A group controller detects a zero weight parameter having a zero value among "n×m" weight parameters to be transferred to a weight parameter buffer. Then, when receiving the zero weight parameter as its input, the group controller exchanges the "n×m" weight parameters to be transferred to the weight parameter buffer so that all multiplication results of the "n" multipliers included in a target multiplier group that is one of the "m" multiplier groups are zero. The group controller controls the target multiplier group to be disabled, and exchanges the "n×m" pixel data to be transferred to the data input buffer, based on the exchange of the "n×m" weight parameters.

10 Claims, 12 Drawing Sheets

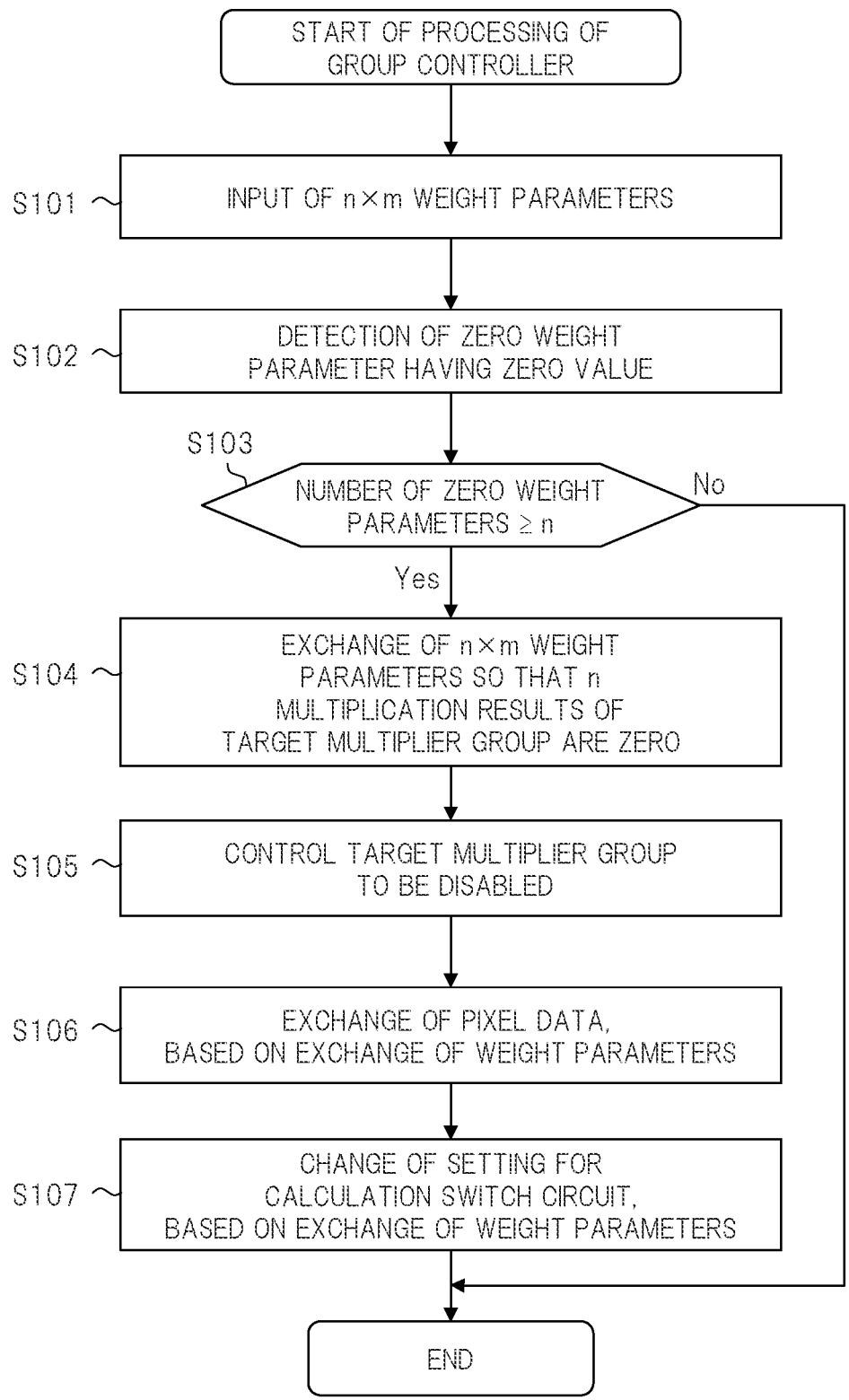

SEMICONDUCTOR DEVICE

CROSS-REFERENCE TO RELATED APPLICATION

The disclosure of Japanese Patent Application No. 2022-081417 filed on May 18, 2022, including the specification, drawings and abstract is incorporated herein by reference in its entirety.

BACKGROUND

The present invention relates to a semiconductor device, and relates to, for example, a semiconductor device executing a neural network processing.

There are disclosed techniques listed below.

[Patent Document 1] Japanese Unexamined Patent Application Publication No. 2021-76900

[Patent Document 2] Japanese Unexamined Patent Application Publication No. 2019-40403

The Patent Document 1 discloses a data processing device configured to determine whether binarized input data is "0" or "1", read out a corresponding coefficient from a storage only if the input data is "1", and sequentially executes a multiply-accumulate operation to the read-out coefficient. Regarding this data processing device, the document also discloses a method of eliminating the execution of the multiply-accumulate operation to the most-frequent coefficient by counting frequencies of the respective read-out coefficients and adjusting all the coefficients so that the most-frequent coefficient is offset to be zero.

The Patent Document 2 discloses a semiconductor device configured to generate one integration coefficient table by integrating input coefficient tables of a plurality of channels, multiply each coefficient contained in this integration coefficient table with each pixel value of an input image, and executes the multiply-accumulate operation to each multiplication result for each channel number. Regarding the integration coefficient table, the document also discloses extraction of the largest coefficient from coefficients of the same matrix point among the plurality of channels, and discloses expansion of a matrix size capable of containing the respective coefficients of the plurality of channels.

SUMMARY

For example, in a neural network processing such as Convolutional Neural Network (CNN), huge calculation processing is executed using a plurality of multiply accumulators (referred to as Multiply ACcumulate (MAC) circuits) mounted on the semiconductor device. Specifically, the MAC circuit mainly executes the multiply-accumulate operation to a plurality of pieces of pixel data contained in the image data and a plurality of weight parameters contained in a filter. In recent years, a lot of MAC circuits operating in parallel may be mounted inside the semiconductor device in order to execute the huge multiply-accumulate operation in a short time. As a result, increase in power consumption is particularly unignorable.

Embodiments described later have been made in consideration of such circumstances, and other issues and novel characteristics will be apparent from the description of the present specification and the accompanying drawings.

A semiconductor device of an embodiment executing a neural network processing includes: single or plural memories; "m" multiplier groups each including "n" multipliers in which each of "n" and "m" is an integer number that is equal to or larger than 2; a weight parameter buffer; a data input buffer; first and second DMA controllers; and a group controller. The memory stores a weight parameter and pixel data. The weight parameter buffer outputs the stored "n×m" weight parameters to the "n×m" multipliers, respectively. The data input buffer outputs the stored "n×m" pixel data to the "n×m" multipliers, respectively. The first DMA controller transfers the "n×m" weight parameters from the memory to the weight parameter buffer. The second DMA controller transfers the "n×m" pixel data from the memory to the data input buffer. The group controller controls each "m" multiplier groups to be enabled/disabled. More specifically, the group controller detects a zero weight parameter having a zero value among the "n×m" weight parameters to be transferred to the weight parameter buffer. Then, when receiving the zero weight parameter as its input, the group controller exchanges the "n×m" weight parameters to be transferred to the weight parameter buffer so that all the multiplication results of the "n" multipliers included in a target multiplier group that is one of the "m" multiplier groups are zero. The group controller controls the target multiplier group to be disabled, and exchanges the "n×m" pixel data to be transferred to the data input buffer, based on the exchange of the "n×m" weight parameters.

When the semiconductor device of the embodiment is used, the power consumption can be reduced.

BRIEF DESCRIPTIONS OF THE DRAWINGS

FIG. 4 is a flowchart showing an example of a processing content of a group controller of FIG. 3A.

DETAILED DESCRIPTION

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof. Also, in the embodiments described below, when referring to the number of elements (including number of pieces, values, amount, range, and the like), the number of the elements is not limited to a specific number unless otherwise stated or except the case where the number is apparently limited to a specific number in principle. The number larger or smaller than the specified number is also applicable. Further, in the embodiments described below, it goes without saying that the components (including element steps) are not always indispensable unless otherwise stated or except the case where the components are apparently indispensable in principle. Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above.

Hereinafter, embodiments will be described in detail with reference to the accompanying drawings. Note that components having the same function are denoted by the same reference signs throughout the drawings for explaining the embodiment, and the repetitive description thereof will be omitted. In addition, the description of the same or similar portions is not repeated in principle unless otherwise particularly required in the following embodiments.

First Embodiment

<Outline of Semiconductor Device>

Figure 1:
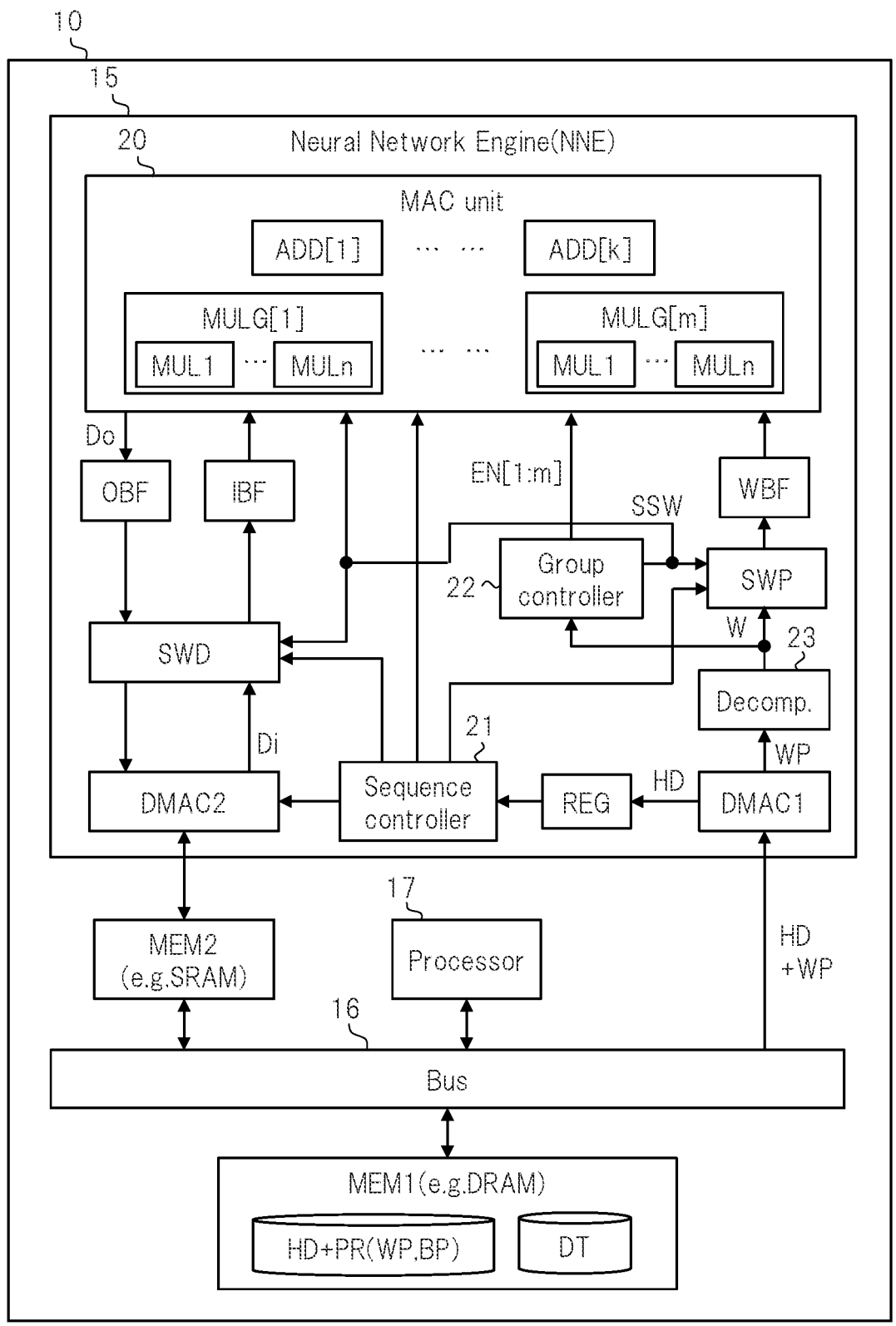
FIG. 1 is a general diagram showing a configurational example of a principal part of a semiconductor device of a first embodiment.

FIG. 1 is a general diagram showing a configurational example of a principal part of a semiconductor device of a first embodiment. A semiconductor device 10 shown in FIG. 1 is, for example, a System on Chip (SoC) made of one semiconductor chip or others. This semiconductor device 10 is typically mounted on an Electronic Control Unit (ECU) of a vehicle or others, and provides a function of Advanced Driver Assistance System (ADAS).

The semiconductor device 10 shown in FIG. 1 includes: a neural network engine (NNE) 15; a processor 17 such as a Central Processing Unit (CPU); single or plural memories MEM1 and MEM2; and a system bus 16. The system bus 16 connects the neural network engine 15, the memories MEM1 and MEM2 and the processor 17. The neural network engine 15 executes a neural network processing typified by the CNN. The processor 17 executes a predetermined program stored in the memory MEM1 to cause the semiconductor device 10 to play a role of a predetermined function including control for the neural network engine 15.

The memory MEM1 is, for example, a Dynamic Random Access Memory (DRAM) or others. The memory MEM1 stores image data DT comprising a plurality of pixel data, a parameter PR, and a header HD added to the parameter PR. The parameter PR includes a weight parameter WP and a bias parameter BP. The header HD includes various types of information for controlling a sequence operation of the neural network engine 15 so as to include setting information of a parameter switch circuit SWP described later.

The neural network engine 15 includes: a plurality of DMA controllers DMAC1 and DMAC2; a MAC unit 20; a sequence controller 21; a group controller 22; a decompressor 23; a register REG; a data switch circuit SWD; a parameter switch circuit SWP; and various buffers. The various buffers include: a weight parameter buffer WBF; a data input buffer IBF; and a data output buffer OBF.

The MAC unit 20 includes: "m" multiplier groups MULG[1] to MULG[m] in which "m" is an integer number that is equal to or larger than 2; and "k" adders ADD[1] to ADD[k] in which "k" is an integer number that is equal to or larger than 2. Each of the "m" multiplier groups MULG[1] to MULG[m] includes "n" multipliers MUL[1] to MUL[n] in which "n" is an integer number that is equal to or larger than 2. In the specification, the "m" multiplier groups MULG[1] to MULG[m] are collectively referred to as a multiplier group MULG, the "n" multipliers MUL[1] to MUL[n] are collectively referred to as a multiplier MUL, and the "k" adders ADD[1] to ADD[k] are collectively referred to as an adder ADD. The MAC unit 20 executes the multiply-accumulate operation using the "n×m" multipliers MUL and the "k" adders ADD.

The weight parameter buffer WBF includes, for example, a latch circuit or others, and outputs the stored "n×m" weight parameters W to the "n×m" multipliers MUL in the MAC unit 20, respectively. The DMA controller DMAC1 transfers the "n×m" weight parameters W from the memory MEM1 to the weight parameter buffer WBF through the system bus 16.

More specifically, the memory MEM1 stores, for example, a compressed weight parameter WP. The DMA controller DMAC1 reads out the header HD and the compressed weight parameter WP from the memory MEM1, stores the header HD into the register REG, and transfers the compressed weight parameter WP to the weight parameter buffer WBF through the decompressor 23 and the parameter switch circuit SWP.

At this stage, the decompressor 23 restores the compressed weight parameter WP to the "n×m" weight parameters W. The parameter switch circuit SWP includes, for example, a cross bar switch or others, and stores the restored weight parameter W into each storage region of the weight parameter buffer WBF by performing 1-to-1 connection, 1-to-N connection, N-to-1 connection or others based on the setting. Note that, for example, setting information of this switch circuit SWP or others is stored in the header HD.

The memory MEM2 is, for example, a Static Random Access Memory (SRAM) or others, and is used as a high-speed cache memory of the neural network engine 15. For example, the image data DT, that is the pixel data, in the memory MEM1 is previously copied in the memory MEM2, and then, is used in the neural network engine 15. The data input buffer IBF includes, for example, a latch circuit or others, and outputs the stored "n×m" pixel data Di to the "n×m" multipliers MUL in the MAC unit 20, respectively. The DMA controller DMAC2 transfers the "n×m" pixel data Di from the memory MEM2 to the data input buffer IBF.

In this manner, the MAC unit 20 performs the multiply-accumulate operation to the "n×m" weight parameters W output from the weight parameter buffer WBF and the "n×m" pixel data Di output from the data input buffer IBF, in other words, performs a convolution layer processing. Although details are omitted, the MAC unit 20 may perform various necessary processing for the CNN, such as addition of a value of the bias parameter BP to the multiply-accumulate operation result, calculation of an activating function and a pooling layer processing. The MAC unit 20 stores pixel data Do resulted from such CNN processing into the data output buffer OBF.

The DMA controller DMAC2 transfers the pixel data Do from the data output buffer OBF to the memory MEM2. The pixel data Do transferred to the memory MEM2 is used as pixel data Di to be input for a next convolution layer. Note that the pixel data is specifically transferred between the DMA controller DMAC2 and the data input buffer IBF or the data output buffer OBF through the data switch circuit SWD. The switch circuit SWD includes, for example, a cross bar switch or others, and performs 1-to-1 connection, 1-to-N connection, N-to-1 connection or others based on the setting.

The sequence controller 21 controls the operation sequence of the entire neural network engine (NNE) 15. As one example, the sequence controller 21 sets the connection setting of the parameter switch circuit SWP, based on the information of the header HD stored in the register REG. And, the sequence controller 21 sets, for example, the transfer setting of the DMA controller DMAC2, the connection setting of the data switch circuit SWD, the calculation setting of the MAC unit and others, based on not-illustrated setting information output from the processor 17.

In the transfer setting of the DMA controller DMAC2, an address range at the time of the transfer of the pixel data Di from the memory MEM2, an address range at the time of the transfer of the pixel data Do to the memory MEM2 and others are determined. In the connection setting of the data switch circuit SWD, a detailed correspondence between a reading address of the memory MEM2 and the plurality of storage regions included in the data input buffer IBF, a detailed correspondence between a writing address of the memory MEM2 and the plurality of storage regions included in the data output buffer OBF and others are determined.

In the calculation setting of the MAC unit 20, connection relation between the "n×m" multipliers MUL and the "k" adders ADD and others are determined based on a size of a filter used for the convolution layer processing, the number of input channels, the number of output channels or others. Note that the sequence controller 21 is arranged in this case. However, in place of the sequence controller 21, the processor 17 may control the operation sequence of the entire neural network engine (NNE) 15.

Although described in detail later, the group controller 22 controls each "m" multiplier groups MULG[1] to MULG[m] to be enabled/disabled by using enable signals EN[1] to EN[m]. The multiplier group MULG controlled to be enabled performs a multiply operation using the "n" multipliers MUL. On the other hand, the multiplier group MULG controlled to be disabled does not perform the multiply operation but, for example, outputs zero that is a default value as the multiplication result of the "n" multipliers MUL.

Figure 2:
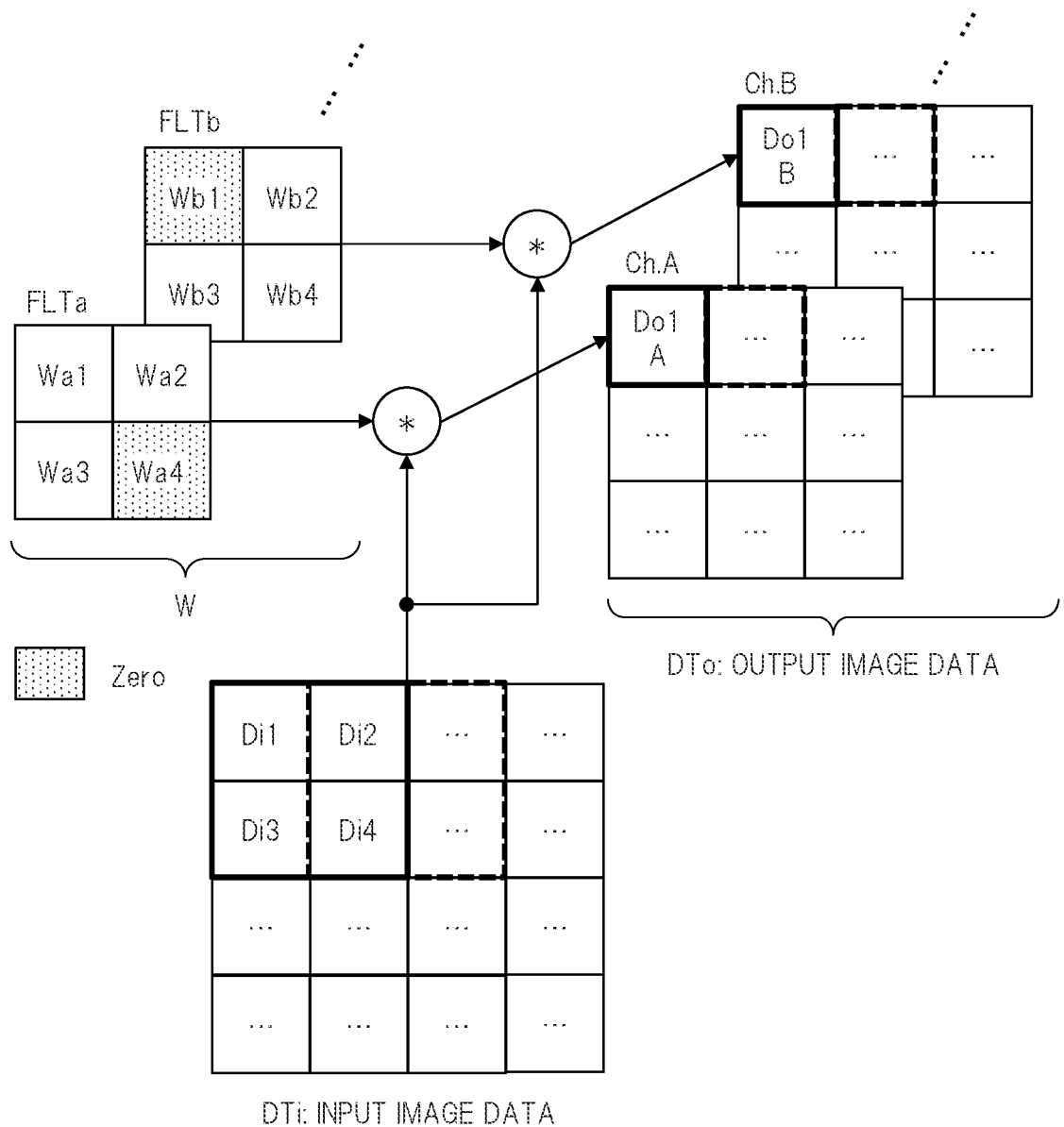
FIG. 2 is a schematic diagram showing a general operation example of a principal part of a MAC unit of FIG. 1.

FIG. 2 is a schematic diagram showing a general operation example of a principal part of the MAC unit of FIG. 1. FIG. 2 shows input image data DTi comprises a plurality of pixel data Di1, Di2, Di3, Di4 . . . and filters FLTa, FLTb . . . corresponding to a plurality of output channels A, B . . . . In this case, for simplification of description, the filter FLTa is made of "X×Y (=2×2)" weight parameters Wa1 to Wa4, and the filter FLTb is also made of "X×Y (=2×2)" weight parameters Wb1 to Wb4. Practically, the filter generally has a size of "X×Y×Z" in which "Z" is the number of input channels, and "X×Y" is often "3×3", "5×5" or others.

The MAC unit 20 generates the output image data DTo of the output channel A, in other words, certain pixel data Do1A in a characteristic map, by performing the multiply-accumulate operation to the pixel data Di1 to Di4 included in a certain pixel range and the weight parameters Wa1 to Wa4 of the output channel A. And, the MAC unit 20 generates certain pixel data Do1B of the output channel B in a characteristic map, by performing the multiply-accumulate operation to the pixel data Di1 to Di4 included in the same pixel range and the weight parameters Wb1 to Wb4 of the output channel B. Further, the MAC unit 20 generates other pixel data in a characteristic map, by performing the same multiply-accumulate operation while shifting the pixel range of the input image data DTi.

By performing such an operation, the MAC unit 20 executes the processing on certain convolution layer in the CNN. The output image data DTo corresponding to the plurality of output channels A, B . . . is used as the input image data corresponding to the plurality of input channels in the next convolution layer. In this case, the plurality of weight parameters Wa1 to Wa4, Wb1 to Wb4 . . . generally probably include a lot of zero weight parameters having the zero value. In the example shown in FIG. 2, one weight parameter Wa4 in the filter FLTa and one weight parameter Wb1 in the filter FLTb are the zero weight parameters. In the multiplication with the input of the zero weight parameter, the multiplication result is also zero, and therefore, it is unnecessary to activate the multiplier MUL.

<Details of Neural Network Engine>

Figure 3A:
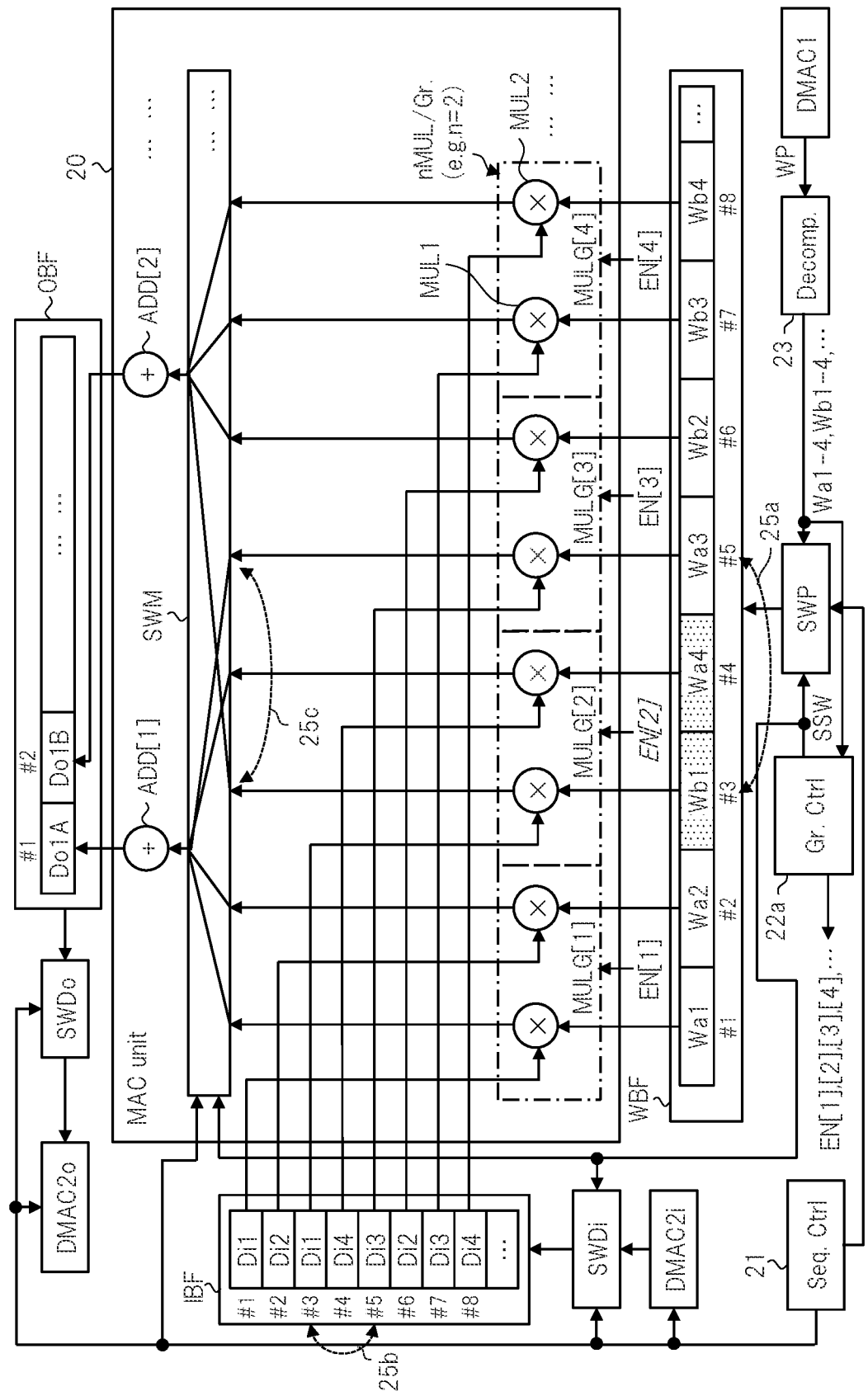
FIG. 3A is a diagram showing detailed configurational example and operation example of a principal part of a neural network engine of FIG. 1.
Figure 3B:
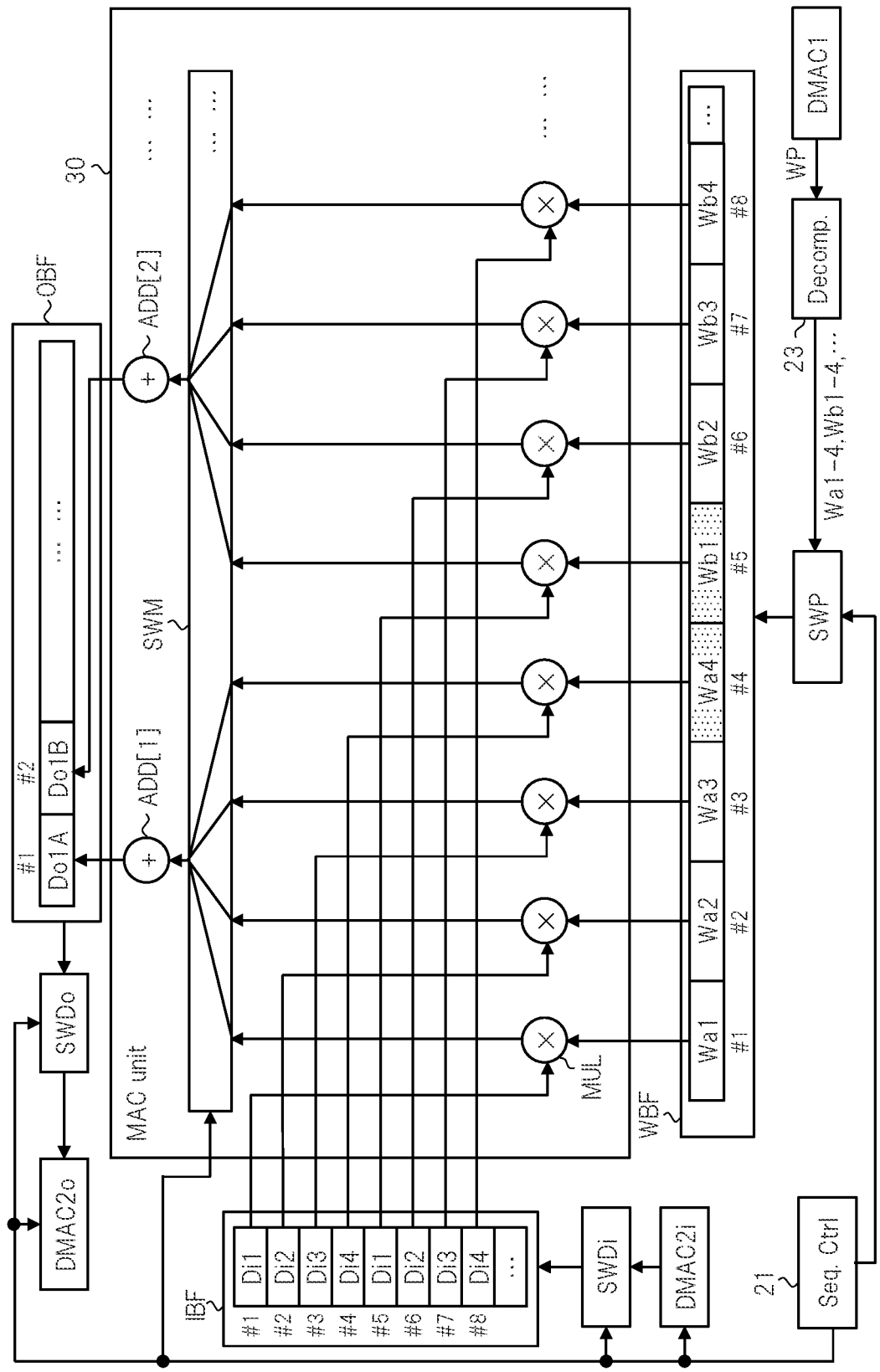
FIG. 3B is a diagram showing a configurational example and an operation example of a comparative example of FIG. 3A.

FIG. 3A is a diagram showing detailed configurational example and operation example of a principal part of the neural network engine of FIG. 1. FIG. 3B is a diagram showing configurational example and operation example of a comparative example of FIG. 3A. First, in the comparative example shown in FIG. 3B, a MAC unit 30 includes: "n×m" multipliers MUL; "k" adders ADD[1], ADD[2] . . . ADD[k]; and a calculation switch circuit SWM. However, the "n×m" multipliers MUL are not grouped to be in the multiplier group MULG as different from the case of FIG. 1.

The calculation switch circuit SWM comprises, for example, a cross bar switch or others. The switch circuit SWM determines connection relation between the "n×m" multipliers MUL and the "k" adders ADD[1], ADD[2] . . . ADD[k], based on the setting signals output from the sequence controller 21. In this example, for the convolution layer processing shown in FIG. 2, the switch circuit SWM connects four multipliers MUL to each of the "k" adders ADD[1], ADD[2] . . . , ADD[k].

The DMA controller DMAC1 transfers, through the decompressor 23 and the parameter switch circuit SWP, the weight parameters Wa1 to Wa4 in the filter FLTa to the storage regions #1 to #4 of the weight parameter buffer WBF, respectively, and transfers the weight parameters Wb1 to Wb4 in the filter FLTb to the storage regions #5 to #8, respectively. At this stage, the switch circuit SWP determines connection relation between the output of the decompressor 23 and each of the storage region #1 to #8 . . . of the weight parameter buffer WBF, based on the setting signals output from the sequence controller 21. Note that each weight parameter is expressed by, for example, 8-bit data, and each storage region is, for example, an 8-bit region or others.

On the other hand, the DMA controller DMAC2 for pixel data shown in FIG. 1 specifically includes: a DMA controller DMAC2i for input data; and a DMA controller DMAC2o for output data, as shown in FIG. 3B. Similarly, the data switch circuit SWD shown in FIG. 1 specifically includes: a switch circuit SWDi for input data; and a switch circuit SWDo for output data, as shown in FIG. 3B.

The DMA controller DMAC2i for input data transfers the pixel data Di1 to Di4 from the memory MEM2 (not shown) to the data input buffer IBF through the switch circuit SWDi for input data, based on the setting signal output from the sequence controller 21. More specifically, the pixel data Di1 to Di4 are transferred to the storage regions #1 to #4 of the data input buffer IBF, respectively, and the pixel data Di1 to Di4 are also transferred to the storage regions #5 to #8, respectively. At this stage, the switch circuit SWDi stores the same pixel data Di1 into the plurality of storage regions #1, #5 . . . , by performing, for example, the 1-to-N connection based on the setting signal output from the sequence controller 21. Note that each pixel data Di is expressed by, for example, 8-bit data, and each storage region is, for example, an 8-bit region or others.

The MAC unit 20 performs the multiply-accumulate operation to the four pixel data Di1 to Di4 stored in the storage regions #1 to #4 of the data input buffer IBF and the four weight parameters Wa1 to Wa4 stored in the storage regions #1 to #4 of the weight parameter buffer WBF by using the four multipliers MUL and the adder ADD[1]. Then, the MAC unit 20 stores the multiply-accumulate result as the pixel data Do1A into the storage region #1 of the data output buffer OBF.

Further, the MAC unit 20 performs the multiply-accumulate operation to the four pixel data Di1 to Di4 stored in the storage regions #5 to #8 of the data input buffer IBF and the four weight parameters Wb1 to Wb4 stored in the storage regions #5 to #8 of the weight parameter buffer WBF by using the four multipliers MUL and the adder ADD[2]. Then, the MAC unit 20 stores the multiply-accumulate result as the pixel data Do1B into the storage region #2 of the data output buffer OBF. Note that each of the storage regions #1, #2 . . . of the data output buffer OBF is, for example, an 8-bit region or others.

The DMA controller DMAC2o for output data transfers the pixel data Do1A and Do1B from the data output buffer OBF to the memory MEM2 not illustrated through the switch circuit SWDo for output data, based on the setting signal output from the sequence controller 21. At this stage, the switch circuit SWDo determines, for example, a suitable mapping of the pixel data Do1A and Do1B in the memory MEM2, based on the setting signal output from the sequence controller 21.

In such configuration and operation, the weight parameters Wa4 and Wb1 stored in the storage regions #4 and #5 of the weight parameter buffer WBF are the zero weight parameters as described in FIG. 2. Therefore, the two multipliers MUL receiving the weight parameters Wa4 and Wb1 as its input do not always need to perform the multiplication operation. If the two multipliers MUL do not perform the multiplication operation, the power consumption can be reduced. Particularly when the number of the multipliers MUL is equal to or larger than 1000 while the number of zero weight parameters is also large, the power consumption can be more significantly reduced.

Accordingly, it is conceivable that, for example, each multiplier MUL is provided with a circuit that outputs a disable signal when the 8-bit weight parameter stored in the storage region are all zero. However, for example, when the number of the multipliers is equal to or larger than 1000, if each multiplier MUL is provided with such a circuit, a circuit area possibly increases. Particularly in a point of view of layout design, it may be difficult to secure a space for arranging such circuit and wire around each multiplier MUL. Accordingly, it is helpful to use the configuration as shown in FIG. 3A.

In the MAC unit 20 in FIG. 3A, each "n", that is each two in this example, of the "n×m" multipliers MUL are grouped for the "m" multiplier groups MULG as different from the case of FIG. 3B. In other words, each of the "m" multiplier groups MULG includes the two multipliers MUL1 and MUL2. And, the enabling signals EN[1], EB[2], EN[3], EN[4] . . . for controlling the enabling/disabling are input to the "m" multiplier groups MULG[1], MULG[2], MULG[3], MULG[4] . . . , respectively.

The multiplier group MULG[1] is corresponded to the storage regions #1 and #2 of the weight parameter buffer WBF and the storage regions #1 and #2 of the data input buffer IBF. Similarly, the multiplier group MULG[2] is corresponded to the storage regions #3 and #4 of each buffer, the multiplier group MULG[3] is corresponded to the storage regions #5 and #6 of each buffer, and the multiplier group MULG[4] is corresponded to the storage regions #7 and #8 of each buffer. Further, in FIG. 3A, a group controller 22a is arranged as different from the case of FIG. 3B.

[Details of Group Controller]

FIG. 4 is a flowchart showing an example of a processing content of the group controller of FIG. 3A. In FIG. 4, as its input, the group controller 22a receives the "n×m" weight parameters W, that are the weight parameters Wa1 to Wa4 and Wb1 to Wb4 in the example shown in FIG. 3A, output from the DMA controller DMAC1 through the decompressor 23 (step S101).

Then, the group controller 22a detects the zero weight parameter having the zero value, that is the weight parameters Wa4 and Wb1 in the example shown in FIG. 3A (step S102). At this stage, the group controller 22a may be provided with a zero determination circuit or others that performs an OR calculation of plural bits such as 8 bits configuring the weight parameter W to detect the zero weight parameter. And, the group controller 22a does not always need to simultaneously detect the zero weight parameters while targeting the "n×m" weight parameters W, and may separately detect the zero weight parameters by performing the detection "(n×m)/M" times for each predetermined number "M". In this case, "M" zero determination circuits may be arranged.

Then, the group controller 22a determines whether the number of zero weight parameters detected in the step S102 is equal to or larger than "n" (step S103). If the number of zero weight parameters is smaller than "n" (step S103: No), the group controller 22a ends the processing. If the number of zero weight parameters is equal to or larger than "n" (step S103: Yes), the processing proceeds to a step S104. In the example of FIG. 3A, the number "n" of the multipliers MUL included in each multiplier group MULG is 2, and the number of the zero weight parameters Wa4 and Wb1 is 2, and therefore, the processing of the step S104 is performed.

In the step S104, when receiving the zero weight parameters as its input, the group controller 22a exchanges the "n×m" weight parameters W to be transferred to the weight parameter buffer WBF so that the multiplication results of the "n" multipliers included in the target multiplier group MULG that is one of the "m" multiplier groups MULG are zero. In other words, as shown with a symbol 25a in FIG. 3A, the group controller 22a exchanges the weight parameters W to be normally arranged as shown in FIG. 3B and stored in the weight parameter buffer WBF.

More specifically, for example, to the parameter switch circuit SWP, the group controller 22a outputs an exchange setting signal SSW for making an instruction of the exchange as shown with the symbol 25a in FIG. 3A. In this manner, the group controller 22a targets the multiplier group MULG[2], and exchanges the weight parameter Wa3 to be normally transferred to the storage region #3 of the weight parameter buffer WBF and the weight parameter Wb1 to be normally transferred to the storage region #5. As a result, both the multiplication results of the two multipliers MUL1 and MUL2 included in the target multiplier group MULG[2] become zero.

Regarding a specific procedure of the exchange, in this example, the group controller 22a sequentially detects a position of the zero weight parameter, based on the normal arrangement of the weight parameters Wa1 to Wa4 and Wb1 to Wb4 to be transferred to the weight parameter buffer WBF, in other words, based on the arrangement shown in FIG. 3B. Then, the group controller 22a targets the firstly detected position that is the multiplier group MULG[2] corresponded to the storage region #4 in the example of FIG. 3B.

Then, the group controller 22a exchanges the weight parameter Wa3 that is the weight parameter of other storage region #3 corresponded to this target multiplier group MULG[2] and that is not zero to be normally transferred to the storage region #3 and the weight parameter Wb1 that is the secondly detected zero weight parameter and that is to be normally transferred to the storage region #5. Then, if there are the thirdly and fourthly detected zero weight parameters, the similar exchange is performed to target the multiplier group MULG corresponded to this thirdly detected position.

In other words, in this procedure, the exchange is performed to target the multiplier group MULG corresponded to the firstly detected position, a "n+1"-th detected position, a "2n+1"-th detected position . . . . Note that a procedure for targeting the multiplier group MULG corresponded to, for example, an n-th detected position, a 2n-th detected position, a 3n-th detected position . . . may be applied as the similar procedure. For example, by the exchange based on such a procedure, the number of times of the exchange can be reduced to some extent. However, the exchange procedure is not particularly limited to such a procedure, and various procedures or others for sequentially storing the zero weight parameter from the storage region #1 may be also applied.

Return to see FIG. 4, and, after the step S104, the group controller 22a controls the target multiplier group MULG that is the multiplier group MULG[2] in the example of FIG. 3A to be disabled by using the enabling signal EN[2] (step S105). The group controller 22a exchanges the "n×m" pixel data to be transferred to the data input buffer IBF as shown with a symbol 25b in FIG. 3A (step S106), based on the exchange of the weight parameters Wa1 to Wa4 and Wb1 to Wb4 in the step S104.

In the example of FIG. 3A, the group controller 22a exchanges the pixel data Di3 to be normally transferred to the storage region #3 of the data input buffer IBF and the pixel data Di1 to be normally transferred to the storage region #5. More specifically, the group controller 22a outputs an exchange setting signal SSW for making an instruction of such exchange to the switch circuit SWDi for input data.

Further, as similar to the case of the step S106, the group controller 22a changes setting of the calculation switch circuit SWM by using the exchange setting signal SSW (step S107), based on the exchange of the weight parameters Wa1 to Wa4 and Wb1 to Wb4 in the step S104. More specifically, the group controller 22a exchanges a connection destination of the multiplier MUL1 in the multiplier group MULG[2] corresponded to the storage region #3 and a connection destination of the multiplier MUL1 in the multiplier group MULG[3] corresponded to the storage region #5 as shown with a symbol 25c in FIG. 3A.

In this manner, as shown in FIG. 3A, the connection destination of the multiplier MUL1 in the multiplier group MULG[2] is changed from the adder ADD[1] to the adder ADD[2], and the connection destination of the multiplier MUL1 in the multiplier group MULG[3] is changed from the adder ADD[2] to the adder ADD[1]. As a result, the same multiply-accumulate result as that of the case of FIG. 3B can be provided in the state in which the multiplier group MULG[2] is disabled.

In the example of FIG. 3A, for simplifying the explanation, note that the number of the multipliers MUL in the multiplier group MULG is 2. However, the number may be a value such as 10 and 100. And, as shown in FIG. 2, this example is in the case of the parallel execution of the multiply-accumulate operation using the plurality of filters FLTa, FLTb . . . at certain control cycle. However, if the size of one filter is large such as "X×Y×Z=3×3×1000", the multiply-accumulate operation may be executed using one filter at certain control cycle. In this case, it is not always necessary to perform the exchange in the calculation switch circuit SWM as shown in FIG. 3A.

[General Operation of Neural Network Engine]

Figure 5:
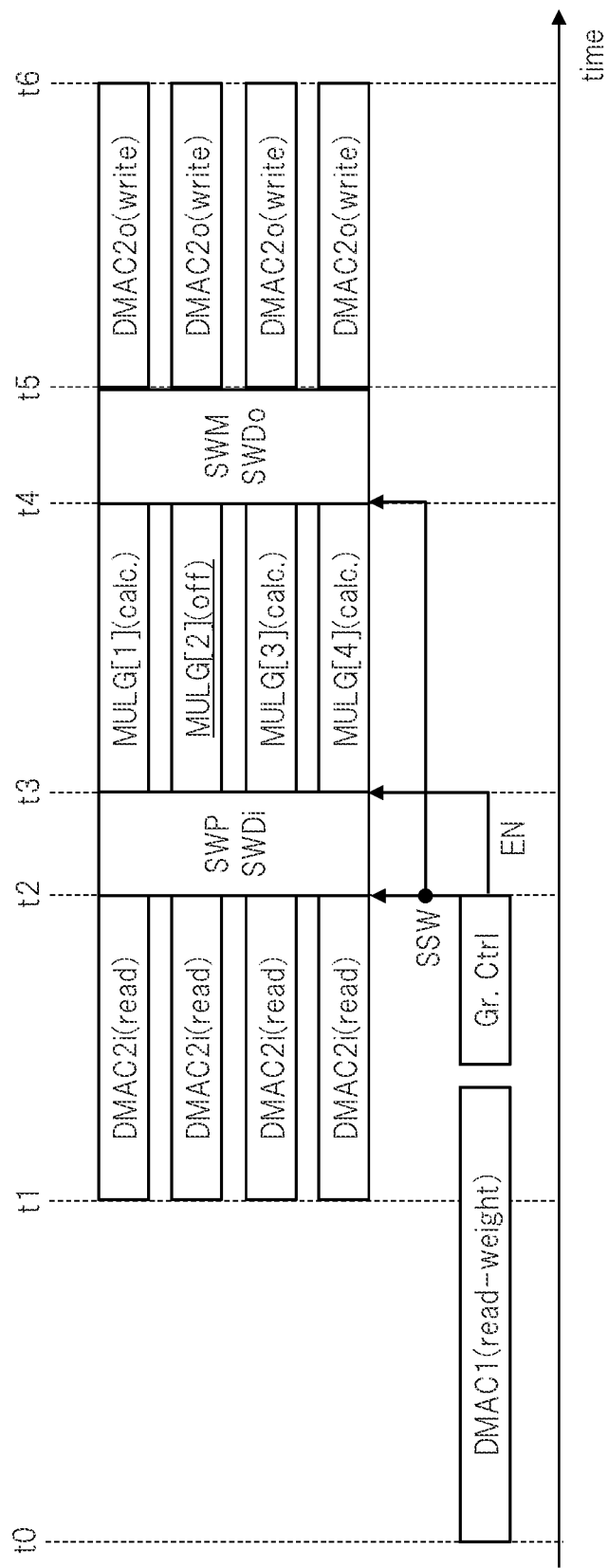
FIG. 5 is a timing chart showing a general operation example of the entire neural network engine of FIG. 3A.

FIG. 5 is a timing chart showing a general operation example of the entire neural network engine in FIG. 3A. From a time point t1 to a time point t3 shown in FIG. 5, the data-input DMA controller DMAC2i transfers the pixel data Di from the memory MEM2 to the data input buffer IBF through the switch circuit SWDi for input data. The DMA controller DMAC2i specifically includes a plurality of channels, and transfers the pixel data Di in parallel by using the plurality of channels.

In this example, at a time point t0 before the time point t1, the DMA controller DMAC1 for parameter starts the transfer of the weight parameter W from the memory MEM1 to the weight parameter buffer WBF. The group controller 22a receives the weight parameter W to be transferred to this weight parameter buffer WBF as its input, and detects the zero weight parameter as described in FIG. 4 and others.

Then, at a time point t2 before the time point t3, the group controller 22a outputs the exchange setting signal SSW to the parameter switch circuit SWP and the switch circuit SWDi for input data, based on the detection result of the zero weight parameter. Also, the group controller 22a outputs the exchange setting signal SSW to the calculation switch circuit SWM. Further, the group controller 22a controls the target multiplier group MULG[2] to be disabled by using the enabling signal EN[2] based on this exchange of the weight parameter W.

During the time point t2 to the time point t3, the parameter switch circuit SWP stores the weight parameter W into the storage region in the weight parameter buffer WBF based on the setting signal output from the sequence controller 21, and exchanges a destination of the storage based on the exchange setting signal SSW output from the group controller 22a. Similarly, the switch circuit SWDi for input data stores the pixel data Di into the storage region in the data input buffer IBF based on the setting signal output from the sequence controller 21, and exchanges a destination of the storage based on the exchange setting signal SSW output from the group controller 22a.

During the time point t3 to a time point t4, the "m" multiplier groups MULG[1] to MULG[4] multiply the pixel data Di stored in the data input buffer IBF and the weight parameter W stored in the weight parameter buffer WBF. However, at this stage, the target multiplier group MULG[2] is controlled to be disabled by the enabling signal EN[2] output from the group controller 22a.

During the time point t4 to a time point t5, the calculation switch circuit SWM connects the output of each multiplier MUL in the "m" multiplier groups MULG [1] to MULG[4]

to any of the "k" adders ADD[1], ADD[2] . . . , based on the setting signal output from the sequence controller 21. At this stage, the calculation switch circuit SWM exchanges the destination of the connection based on the sequence controller 21, based on the exchange setting signal SSW output from the group controller 22*a*. Then, the multiply-accumulate operation results of the "k" adders ADD[1], ADD[2] . . . , that are the output pixel data Do, are stored in the respective storage regions #1, #2 . . . in the data output buffer OBF.

During the time point t4 to a time point t6, the DMA controller DMAC2*o* for output data transfers the pixel data Do stored in each of the storage regions #1, #2 . . . in the data output buffer OBF to the memory MEM2 through the switch circuit SWDo for output data. The DMA controller DMAC2*o* specifically includes a plurality of channels, and transfers the pixel data Do in parallel by using the plurality of channels. At this stage, the switch circuit SWDo for output data transfers the pixel data Do stored in each of the storage regions #1, #2 . . . in the data output buffer OBF to a predetermined channel of the DMA controller DMAC2*o*, based on the setting signal output from the sequence controller 21.

The neural network engine 15 repeatedly executes the operation as shown in FIG. 5 from the time point t1 to the time point t6 in accordance with the convolution layer processing. If the filter changes, a new operation is additionally executed by the DMA controller DMAC1 for parameter and the group controller 22*a* shown from the time point t0 to the time point t2.

Main Effect of First Embodiment

As described above, by the arrangement of the group controller 22*a* in the method of the first embodiment, the weight parameter W to be transferred to the weight parameter buffer WBF is exchanged so that all the multiplication results of the "n" multipliers MUL included in the target multiplier group MULG are zero. In this manner, this target multiplier group MULG can be controlled to be disabled, and the power consumption can be reduced. Further, since the enabling signal is provided for not each multiplier MUL but each multiplier group MULG, the increase in the number of wirings in the MAC unit 20 can be particularly suppressed, and the layout design or others can be simplified. Particularly the larger the number of multipliers MUL included in the MAC unit 20 is, in other words, the more the necessity of the execution of the high-speed multiply-accumulate operation is, the clearer the effects are.

Second Embodiment

<Details of Neural Network Engine>

Figure 6:
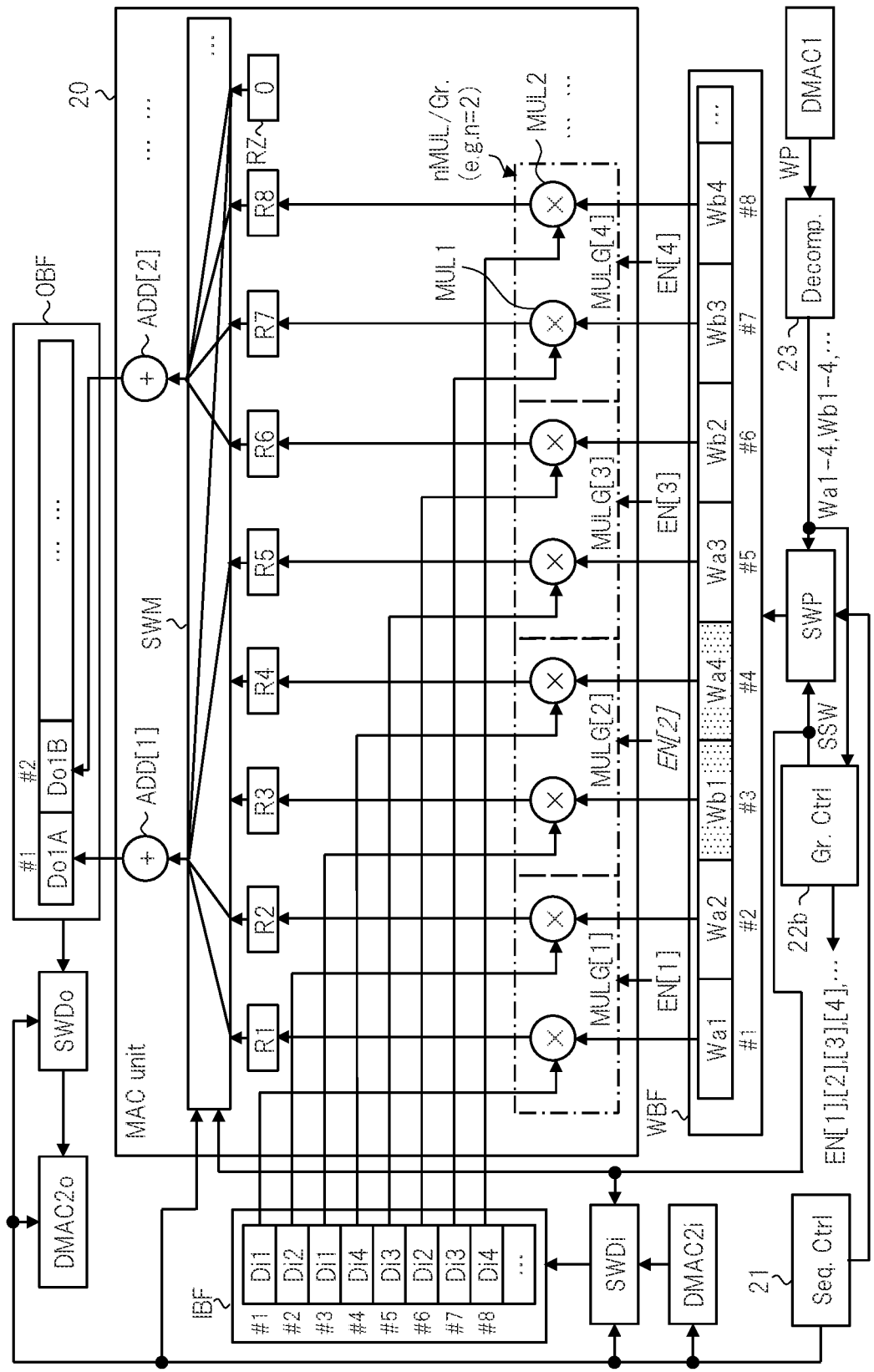
FIG. 6 is a diagram showing detailed configurational example and operation example of the principal part of the neural network engine of FIG. 1 in a semiconductor device of a second embodiment.

FIG. 6 is a diagram showing detailed configurational example and operation example of a principal part of the neural network engine of FIG. 1 in a semiconductor device of a second embodiment. The configurational example shown in FIG. 6 is different in the following two points from the configurational example shown in FIG. 3A. A first difference is that the MAC unit 20 includes registers R1 to R8 . . . that store the multiplication results of the respective multipliers MUL, and further includes a zero register RZ that always stores the zero value. A second difference is that the calculation switch circuit SWM performs exchange as different from the case of FIG. 3A, based on an exchange setting signal SSW output from a group controller 22*b*.

Although omitted in FIG. 3A, the multiplication results of the respective multipliers MUL are generally stored in the registers R1 to R8 . . . as shown in FIG. 6, and then, are added by the adders ADD[1], ADD[2] . . . . However, when the target multiplier group MULG[2] is disabled as shown in the case of FIG. 3A, the multiplication results of the multipliers MUL1 and MUL2 in this group are indefinite in principle. As a result, zero is not always stored into the registers R3 and R4 corresponded to these multipliers MUL1 and MUL2.

Accordingly, to the calculation switch circuit SWM, the group controller 22*b* outputs information of a position of the register having the multiplication result that is zero, that is information about the registers R3 and R4 in this example, as a part of the exchange setting signal SSW. Based on this information, the calculation switch circuit SWM changes both the inputs output from the registers R3 and R4 into an input output from the zero register RZ as seen from the comparison between FIGS. 3A and 6.

Main Effect of Second Embodiment

As described above, even by the usage of the method of the second embodiment, the similar effects to various effects described in the first embodiment can be provided. Further, after the multiplication result of the multiplier group MULG that is controlled to be disabled becomes exactly zero, the adders ADD[1], ADD[2] . . . can perform the addition. As a result, the erroneous multiply-accumulate operation can be exactly prevented.

Third Embodiment

<Details of Neural Network Engine>

Figure 7:
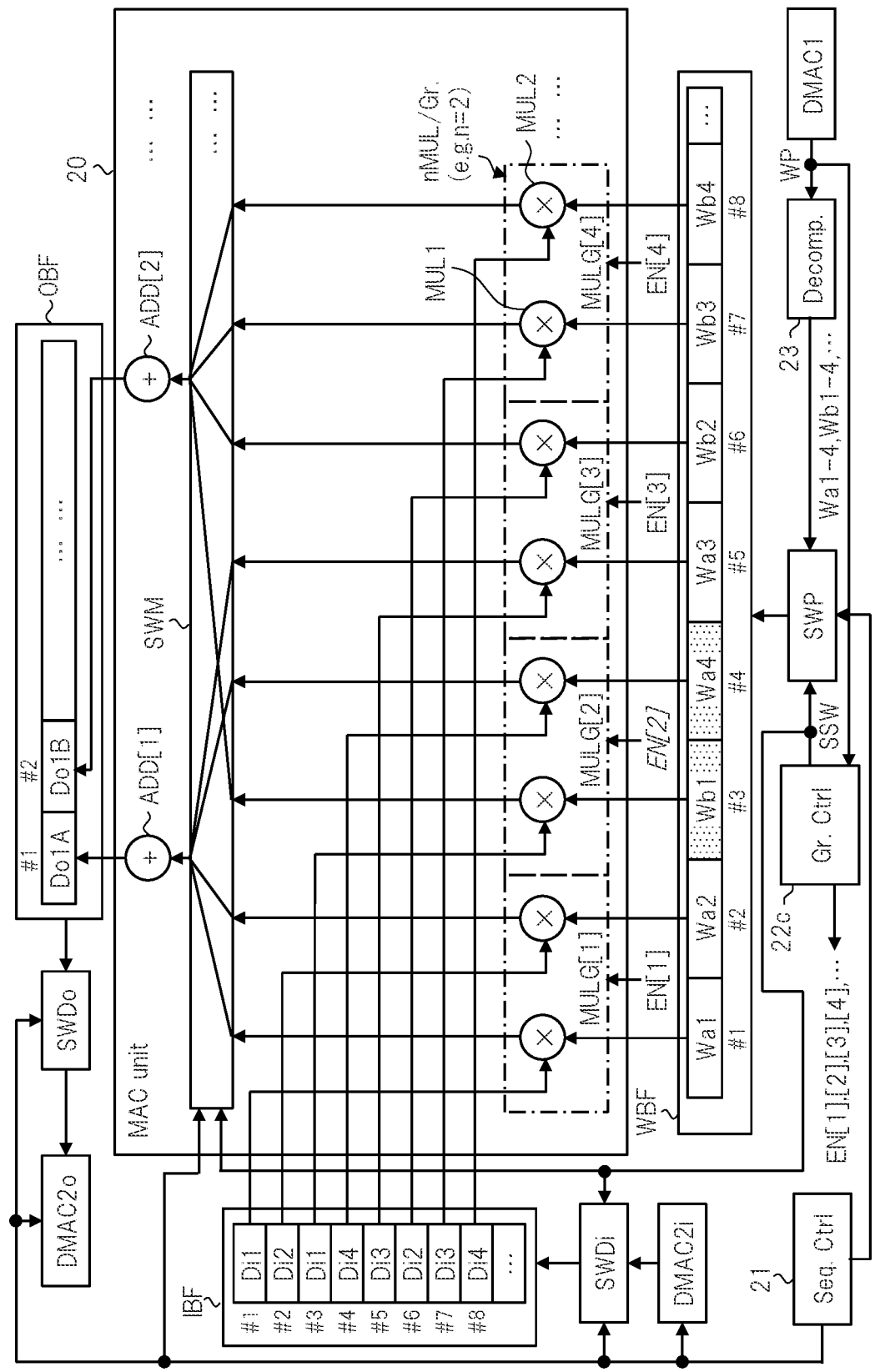
FIG. 7 is a diagram showing detailed configurational example and operation example of the principal part of the neural network engine of FIG. 1 in a semiconductor device of a third embodiment.

FIG. 7 is a diagram showing detailed configurational example and operation example of a principal part of the neural network engine of FIG. 1 in a semiconductor device of a third embodiment. The configurational example shown in FIG. 7 is different in the following one point from the configurational example shown in FIG. 3A. In other words, in the strep S102 of FIG. 4, a group controller 22*c* determines whether each of the "n×m" weight parameters Wa1 to Wa4 and Wb1 to Wb4 . . . is zero or not with reference to not the output of the decompressor 23 but the compressed weight parameter WP to be input to the decompressor 23.

Figure 8:
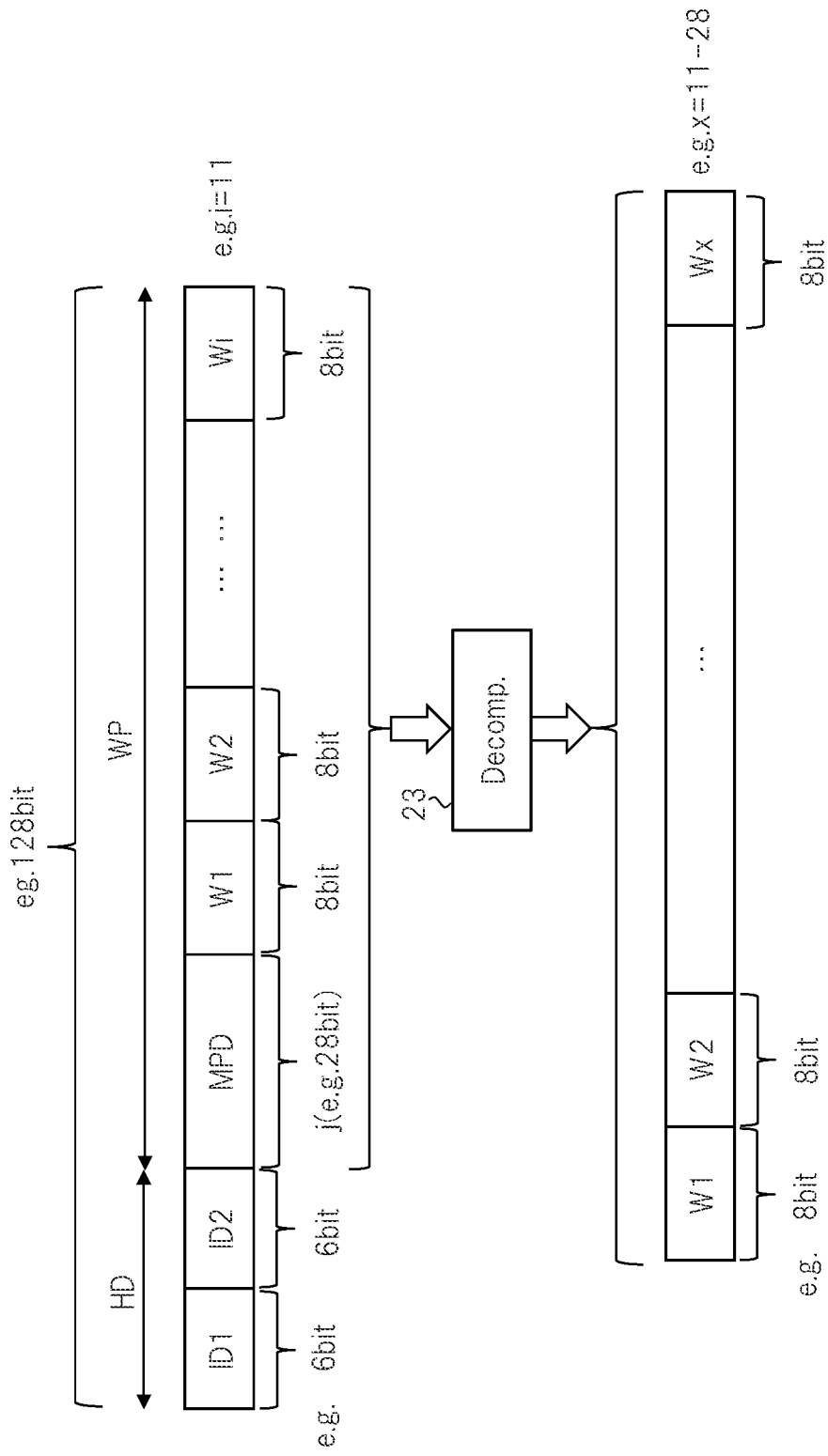
FIG. 8 is a diagram for explaining an example of a processing content of a decompressor in FIG. 7.
Figure 9:
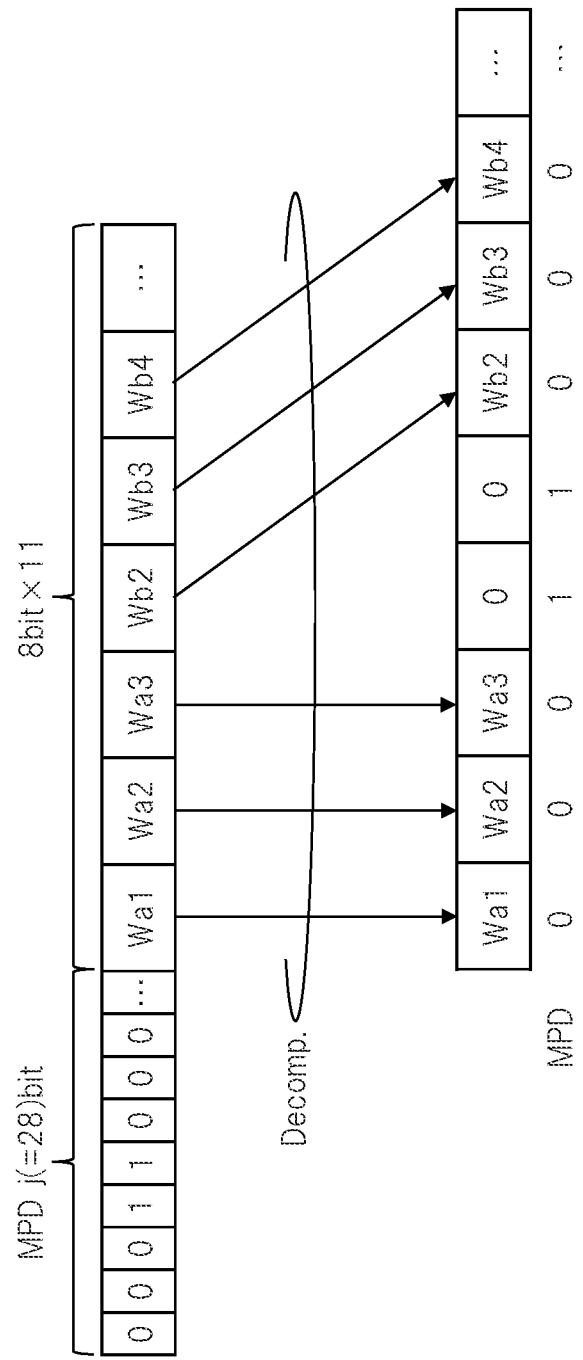
FIG. 9 is a diagram showing a specific example of the processing content of FIG. 8.

FIG. 8 is a diagram for explaining an example of a processing content of the decompressor in FIG. 7. FIG. 9 is a diagram showing a specific example of the processing content of FIG. 8. First, as described in FIG. 1, the memory MEM1 previously stores the compressed weight parameter WP as shown in FIG. 8. Then, as shown in FIG. 8, the DMA controller DMAC1 for parameter reads out the compressed weight parameter WP and the header HD attached to this weight parameter from the memory MEM1, and outputs the compressed weight parameter WP of them to the decompressor 23.

As shown in FIG. 1, note that the header HD is output to the sequence controller 21 through the register REG. As shown in FIG. 8, the header HD includes, for example, a transfer-source identifier ID1 and a transfer-destination identifier ID2 and others used in the parameter switch circuit SWP. The sequence controller 21 determines connection relation in the switch circuit SWP, based on the information of this header HD.

In FIG. 8, the compressed weight parameter WP is made of a set of map data MPD of "j" bits that are 28 bits in this example, in which "j" is an integer number that is equal to or larger than 2, and "i", that is 11 in this example, weight parameters W1, W2 . . . , Wi in which "i" is an integer number that is equal to or larger than 2. Each bit of the map data MPD of 28 bits represents that the weight parameter is either zero or non-zero. The 11 weight parameters W1, W2 . . . , Wi are sequentially corresponded to the bits representing the non-zero in the map data MPD. As a result, the decompressor 23 restores at least 11 and at most 28 weight parameters W1, W2 . . . , Wx from the compressed weight parameters WP including the 11 weight parameters WP1, WP2 . . . , WPi.

As a specific example, in an example of FIG. 9, the map data MPD of 28 bits include "00011000 . . . ", and the 11 weight parameters W sequentially includes Wa1, Wa2, Wa3, Wb2, Wb3, Wb4 . . . . The 28 bits of the map data MPD correspond to the 28 weight parameters W, respectively, and each of the 28 weight parameters W represents either zero that means the zero weight parameter or the non-zero. In this example, the weight parameter W corresponding to the bit representing that the map data MPD is "1" is zero. The 11 weight parameters W are sequentially corresponded as the weight parameters each corresponding to the bit representing that the map data MPD is "0".

In this manner, as shown in FIG. 9, the decompressor 23 outputs the restored weight parameters Wa1, Wa2, Wa3, 0, 0, Wb2, Wb3, Wb4 . . . in an arrangement order stored in the weight parameter buffer WBF in FIG. 3B. Based on such a method, if all 28 bits of the map data MPD in FIG. 8 represent "1", the decompressor 23 outputs the 28 zero weight parameters. On the other hand, if all the first to eleventh bits of the map data MPD represent "0", the decompressor 23 outputs the 11 weight parameters W1, W2, . . . , W11 representing the non-zero.

As shown in FIGS. 8 and 9, the group controller 22c in FIG. 7 determines whether each of the "n×m" weight parameters Wa1 to Wa4 and Wb1 to Wb4 . . . is zero with reference to the map data MPD in the compressed weight parameter WP to be input to the decompressor 23. In the example of FIG. 9, the group controller 22c detects the position of the bit representing "1" in the map data MPD and the number of the bits representing "1".

Main Effect of Third Embodiment

As described above, even by the usage of the method of the third embodiment, the similar effects to various effects described in the first embodiment can be provided. Further, since the map data MPD is used, it is unnecessary to, for example, arrange the zero determining circuit that performs the OR calculation of 8 bits for each weight parameter W, as different from the method of the first embodiment. Therefore, the circuit area can be reduced, and the time for the zero determination can be shortened.

Fourth Embodiment

<Details of Neural Network Engine>

Figure 10:
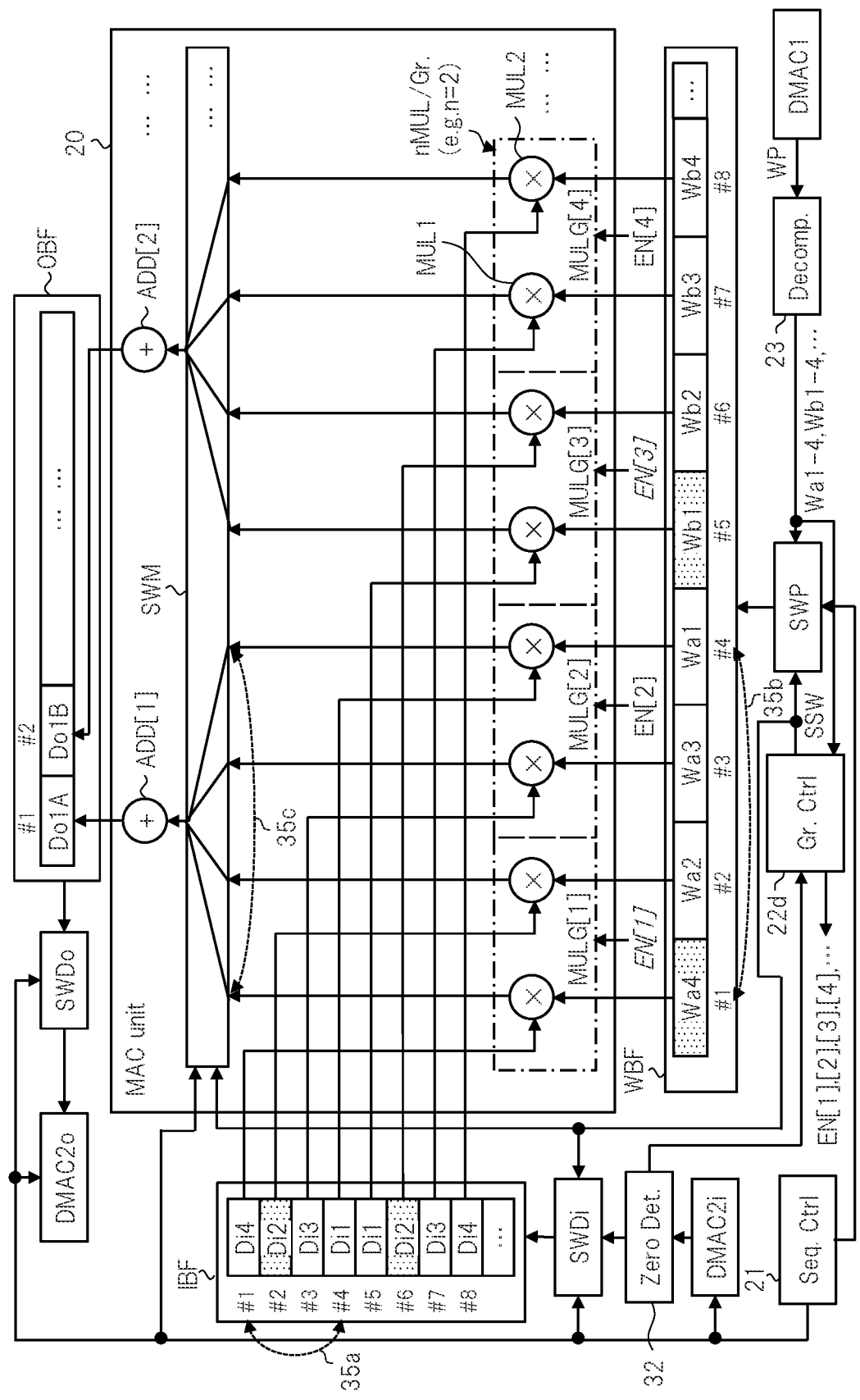
FIG. 10 is a diagram showing detailed configurational example and operation example of the principal part of the neural network engine of FIG. 1 in a semiconductor device of a fourth embodiment.
Figure 11:
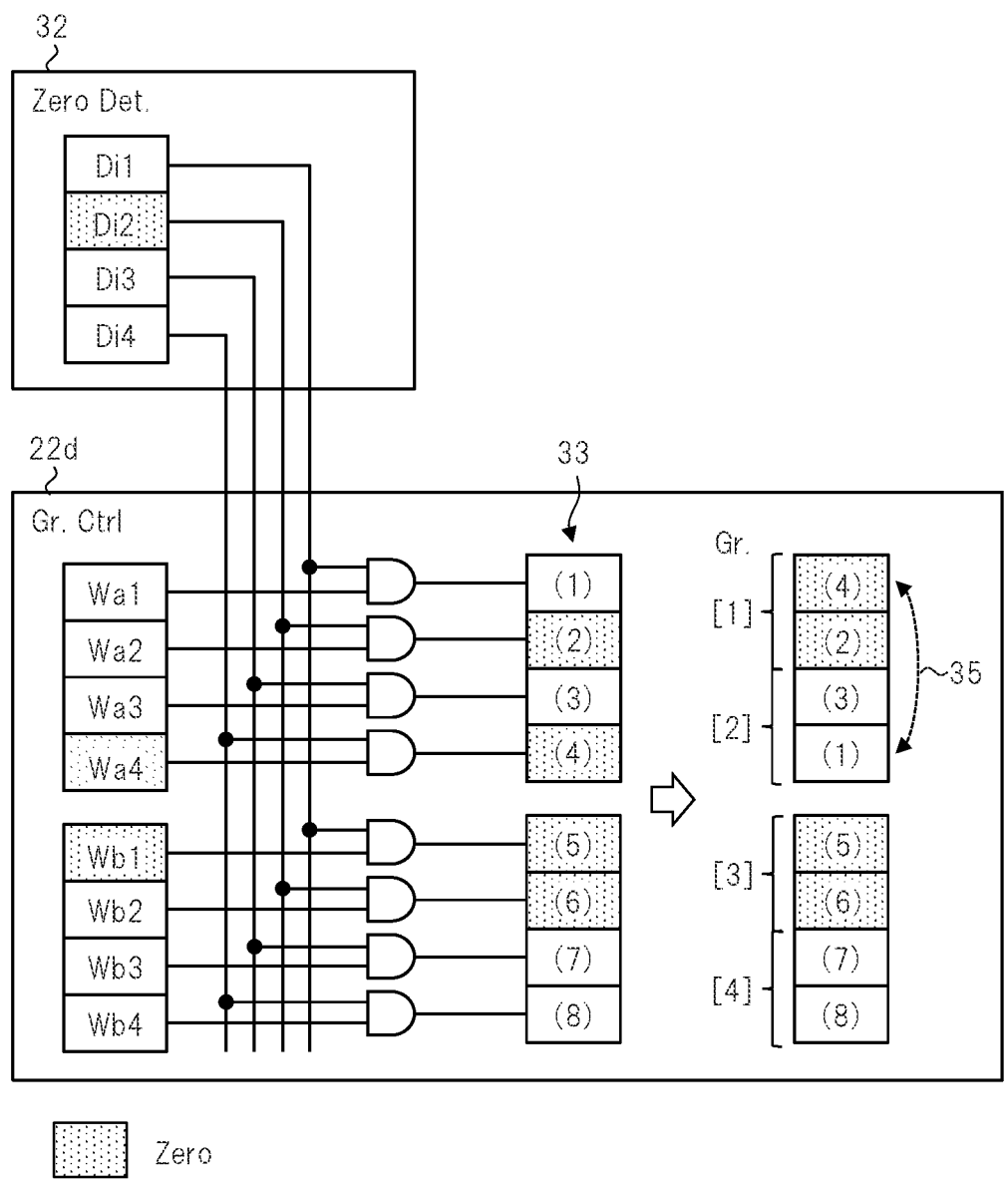
FIG. 11 is a schematic diagram showing a specific operation example of a group controller of FIG. 10.

FIG. 10 is a diagram showing detailed configurational example and operation example of a principal part of the neural network engine of FIG. 1 in a semiconductor device of a fourth embodiment. FIG. 11 is a schematic diagram showing a specific operation example of a group controller of FIG. 10. The configurational example shown in FIG. 10 is different in the following two points from the configurational example shown in FIG. 3A. A first difference is that a zero-data detecting circuit 32 for detecting the zero pixel data having the zero value is arranged between the data-input DMA controller DMAC2i and the switch circuit SWDi for input data. A second difference is that a group controller 22d performs the exchange based on a detection result of the zero-data detecting circuit 32 in addition to the detection result regarding the zero weight parameter.

In other words, by using the zero-data detecting circuit 32, the group controller 22d detects a position of the zero pixel data among the "n×m" pixel data Di to be transferred to the data input buffer IBF. Then, when receiving the detected zero pixel data or the detected zero weight parameter as its input, the group controller 22d performs the exchange so that all the multiplication results of the "n" multipliers MUL included in the target multiplier group MULG are zero.

More specifically, the group controller 22d exchanges the "n×m" pixel data Di to be transferred to the data input buffer IBF by using the switch circuit SWDi for input data, and exchanges the "n×m" weight parameters W to be transferred to the weight parameter buffer WBF by using the parameter switch circuit SWP. Further, the group controller 22d also exchanges the connection relation in the calculation switch circuit SWM, based on these exchanges.

As a specific example, in FIG. 11, both the weight parameters Wa4 and Wb1 are the zero weight parameters as similar to the case of the first embodiment. Further, in FIG. 11, the pixel data Di2 is the zero pixel data. The zero detecting circuit 32 detects the position of this zero pixel data, and outputs information of this position to the group controller 22d. The group controller 22d targets the same pixel data Di1 to Di4, and detects a position of the multiplier MUL in which at least one of the pixel data Di and the weight parameter W is zero, in a premise in which the multiplication of the weight parameters Wa1 to Wa4 and the multiplication of the weight parameters Wb1 to Wb4 are executed by each multiplier MUL.

FIG. 11 shows the position of the multiplier MUL detected as described above as a zero-position detection result 33. The group controller 22d performs the exchange so that all the multiplication results of the "n" multipliers MUL included in the target multiplier group MULG are zero, based on this zero-position detection result 33. In the example shown in FIG. 11, the group controller 22d exchanges the weight parameters Wa1 and Wa4 as shown with a symbol 35.

FIG. 10 shows a state provided after such exchange. In other words, as shown with a symbol 35b, the group controller 22d exchanges the weight parameter Wa1 to be normally stored in the storage region #1 in the weight parameter buffer WBF and the weight parameter Wa4 to be normally stored in the storage region #4. And, as shown with a symbol 35a, the group controller 22d exchanges the pixel data Di1 to be normally stored in the storage region #1 in the data-input parameter buffer IBF and the pixel data Di4 to be normally stored in the storage region #4.

Further, as shown with a symbol 35c, the group controller 22d exchanges the destination of connection of the multiplier MUL1 in the multiplier group MULG[1] and the destination of connection of the multiplier MUL2 in the multiplier group MULG[2]. However, in this example, the destination of connection does not change before and after the exchange. Then, the group controller 22d controls the multiplier groups MULG[1] and MULG[3] both to be disabled by using the enabling signals EN[1] and EN[3].

Main Effect of Fourth Embodiment

As described above, even by the usage of the method of the fourth embodiment, the similar effects to various effects described in the first embodiment can be provided. Further, since the exchange is performed by the input of not only the zero weight parameter but also the zero pixel data so that the multiplication result of the target multiplier group MULG is zero, the number of the multiplier groups MULG controlled to be disabled can be made larger than that of the case of the first embodiment. As a result, the power consumption can be further reduced.

In the foregoing, the invention made by the inventors of the present application has been concretely described on the basis of the embodiments. However, it is needless to say that the present invention is not limited to the foregoing embodiments, and various modifications can be made within the scope of the present invention.

What is claimed is:

1. A semiconductor device executing a neural network processing, comprising:
   single or plural memories configured to store weight parameters and pixel data;
   "m" multiplier groups each configured to include "n" multipliers in which each of "n" and "m" is an integer number that is equal to or larger than 2;
   a weight parameter buffer configured to output the stored "n×m" weight parameters to the "n×m" multipliers, respectively;
   a data input buffer configured to output the stored "n×m" pixel data to the "n×m" multipliers, respectively;
   a first Direct Memory Access (DMA) controller configured to transfer the "n×m" weight parameters from the memory to the weight parameter buffer;
   a second Direct Memory Access (DMA) controller configured to transfer the "n×m" pixel data from the memory to the data input buffer; and
   a group controller configured to control each "m" multiplier groups to be enabled/disabled,
   wherein the group controller is configured to
      detect a zero weight parameter having a zero value among the "n×m" weight parameters to be transferred to the weight parameter buffer, and,
      when receiving the zero weight parameter as its input, exchange the "n×m" weight parameters to be transferred to the weight parameter buffer so that all multiplication results of the "n" multipliers included in a target multiplier group that is one of the "m" multiplier groups are zero,
      control the target multiplier group to be disabled, and
      exchange the "n×m" pixel data to be transferred to the data input buffer, based on the exchange of the "n×m" weight parameters.

2. The semiconductor device according to claim 1, further comprising:
   "k" adders configured to add the multiplication results output from the "n×m" multipliers in which "k" is an integer number that is equal to or larger than 2; and
   a switch circuit configured to determine connection relation between the "n×m" multipliers and the "k" adders, based on setting,
   wherein the group controller is configured to change setting of the switch circuit, based on the exchange of the "n×m" weight parameters.

3. The semiconductor device according to claim 1,
   wherein the group controller is configured to receive the "n×m" weight parameters output from the first DMA controller as its input, and determine whether each of the input "n×m" weight parameters is zero or not.

4. The semiconductor device according to claim 1,
   wherein the memory is configured to store, as a compressed weight parameter, a set of map data of "j" bits in which "j" is an integer number that is equal to or larger than 2 and each of which represents whether the weight parameter is zero or non-zero, and a plurality of weight parameters sequentially corresponded to the bits representing the non-zero,
   wherein the semiconductor device further includes a decompressor configured to restore the compressed weight parameter to be transferred by the first DMA controller, into the "n×m" weight parameters, and
   wherein the group controller is configured to determine whether each of the "n×m" weight parameters is zero or not with reference to the map data in the compressed weight parameter to be input to the decompressor.

5. The semiconductor device according to claim 1,
   wherein the group controller is further configured to
      detect a position of zero pixel data having a zero value among the "n×m" pixel data to be transferred to the data input buffer, and,
      when receiving the detected zero pixel data or the detected zero weight parameter as its input, exchange the "n×m" pixel data to be transferred to the data input buffer and the "n×m" weight parameters to be transferred to the weight parameter buffer so that all multiplication results of the "n" multipliers included in the target multiplier group are zero, and
      control the target multiplier group to be disabled.

6. A semiconductor device made of one semiconductor chip, comprising:
   a neural network engine configured to execute a neural network processing;
   single or plural memories configured to store weight parameters and pixel data;
   a processor; and
   a bus configured to connect the neural network engine, the memory and the processor,
   wherein the neural network engine includes:
      "m" multiplier groups each configured to include "n" multipliers in which each of "n" and "m" is an integer number that is equal to or larger than 2;
      a weight parameter buffer configured to output the stored "n×m" weight parameters to the "n×m" multipliers, respectively;
      a data input buffer configured to output the stored "n×m" pixel data to the "n×m" multipliers;
      a first Direct Memory Access (DMA) controller configured to transfer the "n×m" weight parameters from the memory to the weight parameter buffer, respectively;
      a second Direct Memory Access (DMA) controller configured to transfer the "n×m" pixel data from the memory to the data input buffer; and
      a group controller configured to control each "m" multiplier groups to be enabled/disabled,
   wherein the group controller is configured to
      detect a zero weight parameter having a zero value among the "n×m" weight parameters to be transferred to the weight parameter buffer, and,
      when receiving the zero weight parameter as its input, exchange the "n×m" weight parameters to be transferred to the weight parameter buffer so that all multiplication results of the "n" multipliers included in a target multiplier group that is one of the "m" multiplier groups are zero, control the target multiplier group to be disabled, and exchange the "n×m" pixel data to be transferred to the data input buffer, based on the exchange of the "n×m" weight parameters.

7. The semiconductor device according to claim 6, further comprising:
"k" adders configured to add the multiplication results output from the "n×m" multipliers in which "k" is an integer number that is equal to or larger than 2; and
a switch circuit configured to determine connection relation between the "n×m" multipliers and the "k" adders, based on setting,
wherein the group controller is configured to change setting of the switch circuit, based on the exchange of the "n×m" weight parameters.

8. The semiconductor device according to claim 6,
wherein the group controller is configured to receive the "n×m" weight parameters output from the first DMA controller as its input, and determine whether each of the input "n×m" weight parameters is zero or not.

9. The semiconductor device according to claim 6,
wherein the memory is configured to store, as a compressed weight parameter, a set of map data of "j" bits in which "j" is an integer number that is equal to or larger than 2 and each of which represents whether the weight parameter is zero or non-zero, and a plurality of weight parameters sequentially corresponded to the bits representing the non-zero,
wherein the neural network engine further includes a decompressor configured to restore the compressed weight parameter to be transferred by the first DMA controller, into the "n×m" weight parameters, and
wherein the group controller is configured to determine whether each of the "n×m" weight parameters is zero or not with reference to the map data in the compressed weight parameter to be input to the decompressor.

10. The semiconductor device according to claim 6,
wherein the group controller is further configured to
detect a position of zero pixel data having a zero value among the "n×m" pixel data to be transferred to the data input buffer, and,
when receiving the detected zero pixel data or the detected zero weight parameter as its input, exchange the "n×m" pixel data to be transferred to the data input buffer and the "n×m" weight parameters to be transferred to the weight parameter buffer so that all multiplication results of the "n" multipliers included in the target multiplier group are zero, and control the target multiplier group to be disabled.

* * * * *